US000001194H

United States Statutory Invention Registration [19]

[11] Reg. Number: H1194

Hassell et al.

[43] Published: Jun. 1, 1993

[54] RIOT CONTROL AGENT

[75] Inventors: Cecil D. Hassell, Rocks, Md.; Lawrence A. Bickford, Stewartstown, Pa.; Sandra D. Smith, Edgewood, Md.; Gartung Cheng, Edison, N.J.

[73] Assignee: The United States of America as represented by the Secretary of the Army, Washington, D.C.

[21] Appl. No.: 972,775

[22] Filed: Nov. 5, 1992

[51] Int. Cl.[5] ..... A01N 25/06; C06B 22/00

[52] U.S. Cl. ..... 149/109.4; 102/334; 102/367; 424/40

[56] References Cited

U.S. PATENT DOCUMENTS 4,405,762 9/1983 Earl et al. ..... 525/410

5,049,214 9/1991 Hassell et al. ..... 149/109.4

5,061,329 10/1991 Reed et al. ..... 144/19.6

*Primary Examiner*—Edward A. Miller

*Attorney, Agent, or Firm*—Anthony T. Lane; Edward Goldberg; Edward F. Costigan

[57] ABSTRACT

A mixture containing 3,3-bis(aziodomethyloxetane) and o-chlorobenzyl malononitrile for use as a riot-control gas.

4 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

RIOT CONTROL AGENT

The invention described herein may be manufactured, used, and licensed by or for the Government for governmental purposes without the payment to us of any royalty thereon.

FIELD OF USE

This invention relates to a pyrotechnic composition which produces a riot-control gas.

BACKGROUND OF THE INVENTION

Due to the fact that pyrotechnics are dangerous, they must be handled with due care, particularly for safety sake. What complicates the problem is that the standard pyrotechnic composition contains a multitude of ingredients, such as fuel, an oxidizer, a coolant, a wetting agent, and a filler.

During manufacture, each of the aforesaid ingredients must be added to each other in a very rigid procedure, and in precise amounts. If this procedure is not carried out in the prescribed manner, there is danger of a hazardous condition which may come into play which could result in a conflagration, fire or even an explosion.

Further, if the ingredients are not incorporated into the composition in the correct amounts, the composition will not function in the correct manner to produce the desired amount of gas, or may even malfunction or explode.

With evidence of the above arguments and facts in our mind, we have invented a composition which consists of no more than two components or ingredients. This composition functions in the precise manner to produce a riot-control gas which is less hazardous to control in manufacture.

DESCRIPTION OF THE INVENTION

The composition we have invented is merely a mixture of an energetic material named 3,3-bis(aziodomethyloxetane) and a gas-producing chemical named o-chlorobenzyl malononitrile.

The range of the energetic material in the composition is between 35 to 65 percent by weight with the remainder being the cited gas producing material for a total of 100 percent by weight which represents the entire composition. If the amount of the energetic material is below 35 percent by weight, the mixture will fail to ignite due to lack of energy. On the other hand, if the amount of gas-producing material is present below 35 percent by weight, the latter yield of gas will fall below acceptable limits. With either ingredients above 35 percent by weight, the other ingredient is present in an amount which will total 100 percent by weight in any combination for the total composition.

Experiments were carried out with an equal weight of both components of the mixture, i.e., 50 percent by weight for each ingredient. However, such mixtures, although acceptable in functions, were not the best in terms of yield of small particle aerosols or what is termed herein as gas.

Based on experience, the best composition contained about 40 percent by weight of the energetic material and 60 percent by weight of the gas-producing material.

PROCEDURE OF MAKING

The energetic material and the gas-producing material are oven-dried at 125 degrees F. Each of the cited components are then pushed through a no. 16 sieve screen to assure particle size below 1.1 9 mm in size. The two components are then mixed together, after drying, in a suitable container with a spatula until homogeneous.

RESULTS

The resulting mixture is a smooth burning pyrotechnic that can be disseminated at will, in large yields of tear-producing gas, into the atmosphere to provide a superior riot-control atmosphere.

The above cool burning mixture produces no toxic gases. It is mostly nitrogen gas and is ideal for riot-control systems, such as M651 CS 40 mm grenade.

The cool burning system produces high yields of airborne tear gas, and less of a chance of starting undesired fires in enclosed areas, such as a room.

FIELD OF USE

The mixture has application in both military and law enforcement operations and may be distributed through systems, such as the M651 40 mm grenade.

It will be apparent to those of ordinary skill in this art that various changes and modifications may be made therein without departing from the scope and spirit of the invention.

What is claimed is:

1. A riot-control agent comprising a mixture of 3,3-bis(azidomethyloxetane) which is an energizer and o-chlorobenzylidene malononitrile which is a tear gas agent.

2. A riot-control agent of claim 1 in which said energizer is present in amount of between about 35 and about 65 percent by weight, and the remainder of a total weight being between about 35 and about 65 percent by weight of said tear gas agent.

3. The riot control agent of claim 1 in which said energizer is present in amount of about 40 percent by weight and said tear gas agent is present in the amount of about 60 percent by weight.

4. The riot control agent of claim 1 in which said energizer is present in amount of about 50 percent by weight and said tear gas agent is present in the amount of about 50 percent by weight.

* * * * *